Dec. 30, 1924.
E. G. THOMAS
1,521,207
ANTISKIDDING CHAIN FOR AUTO WHEELS
Filed April 24, 1919
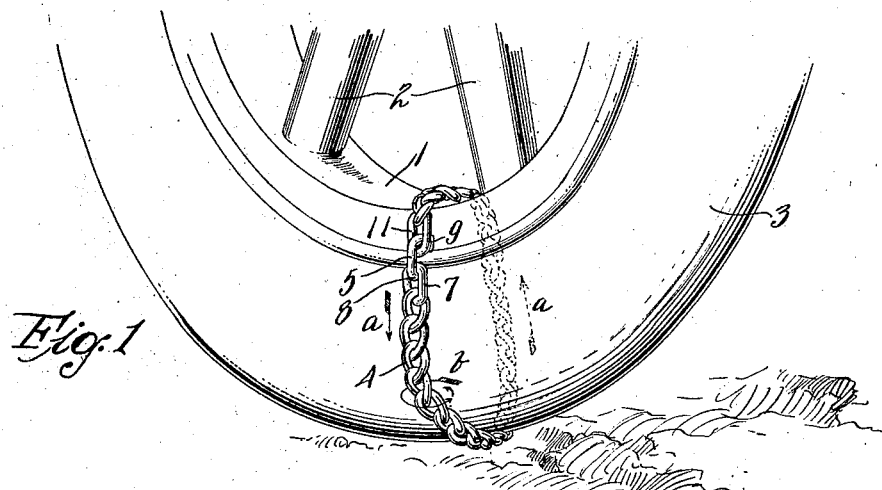
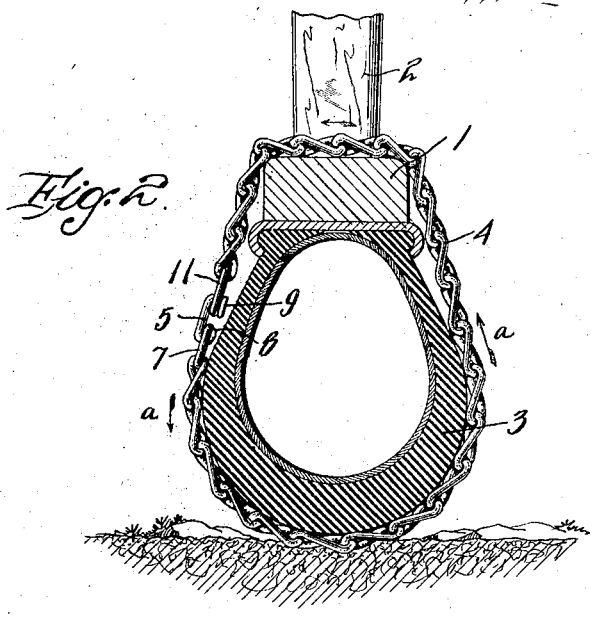
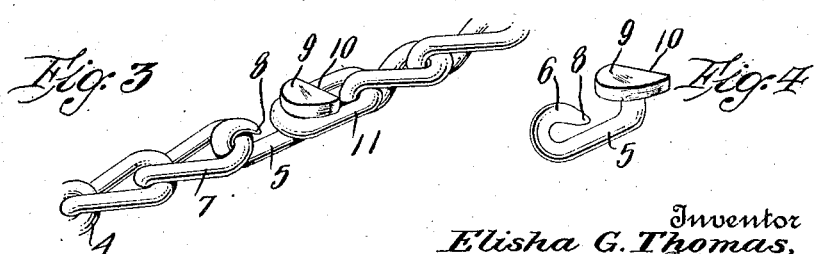
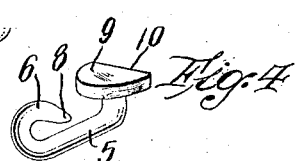
Inventor
Elisha G. Thomas,
By
Attorney Patented Dec. 30, 1924.

1,521,207

UNITED STATES PATENT OFFICE.

ELISHA G. THOMAS, OF WASHINGTON, DISTRICT OF COLUMBIA, ASSIGNOR TO JOSEPH F. HERMAN, OF WASHINGTON, DISTRICT OF COLUMBIA.

ANTISKIDDING CHAIN FOR AUTO WHEELS.

Application filed April 24, 1919. Serial No. 292,350.

*To all whom it may concern:*

Be it known that I, ELISHA G. THOMAS, a citizen of the United States, residing at the city of Washington, District of Columbia, have invented certain new and useful Improvements in Antiskidding Chains for Auto Wheels, of which the following is a specification.

The present invention relates to anti-skidding chains for wheels of automobiles and trucks and consists in the combinations and arrangements of parts hereinafter described and particularly set forth in the accompanying claims.

The invention has for its purpose to provide an anti-skidding chain of single length which is arranged and carried by the wheel in a manner permitting said chain to travel continuously around the wheel felly and tire thereby obtaining the maximum efficiency or working area for the single chain on the wheel.

A further purpose of the invention is to provide an individual chain of this type which will have positive engagement with the surface of the roadway passed over, but which is so attached to the wheel as to creep transversely of the tire, and about the longitudinal axis of the chain itself, thereby subjecting the chain to uniform wearing throughout.

Another purpose of the invention is to provide the chain with a novel form of attaching or fastening means which is of simple construction and readily manipulated for applying or removing the chain from the wheel, but which will effectively hold under all normal working conditions and wear to which the chain would be subjected.

A still further purpose contemplates producing a chain with fastening means for readily attaching the same to the wheel of any auto or truck and which may be quickly removed and conveniently stored for carrying.

The anti-skidding chain is shown by way of illustration in the accompanying drawings wherein:

Fig. 1 illustrates the application of the invention to a wheel.

Fig. 2 is a transverse sectional view of a wheel rim and tire showing the manner of applying the chain and indicating its automatic operation.

Fig. 3 is a detailed fragmentary perspective view of the chain fastening device on the chain, and Fig. 4 shows the fastening device per se.

Referring to the construction in further detail and with like reference characters designating corresponding parts in the different views shown, 1 represents the rim, 2 the spokes, and 3 the tire, of any automobile wheel.

The anti-skidding device comprises a single chain length 4, of uniform and twisted link type, that is adapted to be fitted about the tire and felly, or rim, of the wheel in the manner shown, and the length of chain is such that the same will grip the tire and rim with sufficient tautness to serve its anti-skidding function, and yet allow the chain to automatically creep transversely of the tire after the manner indicated by the arrows $a$ in Figs. 1 and 2. In addition to this function or operation of the chain said chain will automatically turn or twist about the longitudinal axes of the respective chain links as indicated by the circular arrow $b$; i. e., the chain as a whole turns or twists bodily quite independently of its lengthwise traveling movement.

The chain fastening device consists of a "link" or connecting member 5, having a hooked end 6 that is securely connected to one end link 7 of the chain 4. The end portion 8 of said hook is appreciably reduced or pointed and turned in (see Fig. 3) to obviate any likelihood of said hook's injuring the tire or the wheel rim. The attaching end of the connecting piece 5 is formed with a flattened head 9 of substantially circular shape but having a squared or cut off portion as at 10, which readily permits of said hook being connected to or removed from engagement with the link 11, at the other end of the chain. To apply or remove the connecting member 5 requires only the taking up of the slack in the chain and turning the head 9 to the lengthwise direction of the link 11 when said head may be conveniently passed through the opening in said link for application or removal.

It has been found from actual use that the chain 4 due to the uniformity of its twisted lengths travels or "creeps" around the tire and rim as indicated and by reason of this movement the chain and that portion of the tire and rim in contact therewith are subjected to uniform wearing. The tire or rim are therefore not liable to become injured through continual contact with a mutilated chain link which would otherwise be true were the chain not free to move continuously on the wheel.

It is obvious that those skilled in the art may vary the details of construction and arrangement of parts without departing from the spirit of the invention, and therefore I do not wish to be limited to such features except as may be required by the claims.

What is claimed as new is:

1. An anti-skidding device for wheels comprising a single chain length forming a single loop, fitting entirely around the wheel tire and rim and automatically movable in its lengthwise direction and bodily turnable about the longitudinal axes of the respective links, substantially as set forth.

2. An anti-skidding device for wheels comprising a single endless chain length of twisted link type forming a single loop fitting entirely around the wheel tire and rim and adapted to automatically circulate thereon, substantially as set forth.

In testimony whereof I affix my signature.

ELISHA G. THOMAS.